United States Patent
May

(10) Patent No.: US 11,046,382 B2
(45) Date of Patent: Jun. 29, 2021

(54) MOTORCYCLE FOOTREST MOUNT ADAPTER

(71) Applicant: Ciro, LLC, Hudson, WI (US)

(72) Inventor: Darron B. May, Stillwater, MN (US)

(73) Assignee: CIRO CORPORATION, Hudson, WI (US)

( * ) Notice: Subject to any disclaimer, the term of this patent is extended or adjusted under 35 U.S.C. 154(b) by 198 days.

(21) Appl. No.: 16/519,620

(22) Filed: Jul. 23, 2019

(65) Prior Publication Data

US 2021/0024160 A1 Jan. 28, 2021

(51) Int. Cl.
*B62J 25/00* (2020.01)
(52) U.S. Cl.
CPC ...................... *B62J 25/00* (2013.01)
(58) Field of Classification Search
CPC ....................................................... B62J 25/00
See application file for complete search history.

(56) References Cited

U.S. PATENT DOCUMENTS

| | | | | |
|---|---|---|---|---|
| 4,174,852 A | * | 11/1979 | Panzica | B62J 25/00 280/288.4 |
| 5,826,900 A | * | 10/1998 | Steele | B62J 25/00 280/291 |
| 7,104,157 B1 | * | 9/2006 | Hilliard | B62J 25/00 280/291 |
| 8,181,982 B1 | * | 5/2012 | Ward | B62J 25/00 280/291 |
| 9,540,066 B1 | * | 1/2017 | Bloomer | B62J 25/00 |
| 2018/0001951 A1 | * | 1/2018 | May | B62J 25/00 |
| 2021/0024160 A1 | * | 1/2021 | May | B62J 25/06 |

OTHER PUBLICATIONS

Kuryakyn, Splined Peg Adapters, https://www.kuryakyn.com/products/4788/splined-peg-adapters, 2019, 10 pages.
Kuryakyn, Tapered Peg Adapters, https://www.kuryakyn.com/products/1597/tapered-peg-adapters, 2019, 8 pages.

* cited by examiner

*Primary Examiner* — Tony H Winner
(74) *Attorney, Agent, or Firm* — Dicke, Billig & Czaja, PLLC

(57) ABSTRACT

A footrest mount adapter includes a planar body with an upper portion and a lower portion extending at an angle relative to the upper portion. A mounting flange extends from a rear surface of the upper portion of the body for connecting the adapter to a pivot bracket on a motorcycle. The lower portion includes a footrest mount on a front surface for mounting a footrest.

5 Claims, 3 Drawing Sheets

MOTORCYCLE FOOTREST MOUNT ADAPTER

BACKGROUND

Motorcycles such as the Honda Goldwing include a motorcycle operator footrest having a flange or flanges pivotally mounted to a stock pivot bracket on the motorcycle. The pivot bracket consists of a pair of spaced flanges each of which is configured to receive a cotter pin to retain the mounting flange(s) of the footrest. The stock footrest is spring biased and supported at the level of the pivot bracket (i.e., a footrest mounting axis). The flanges of the pivot bracket are oriented at a downward angle relative to the ground and the front of the motorcycle which allows the footrest to pivot at the angle defined by the flanges toward the rear of the motorcycle in the event the footrest contacts the ground. The footrest includes a spring that biases the footrest toward the footrest mounting axis. For motorcycle riders with longer legs, or desiring a lower footrest location, the location of the stock footrest may not be optimal. Also, a splined footrest mount offers greater adjustability for a footrest position and/or a range of footrest sizes and styles. It would be beneficial to be able to lower and/or change the location of a motorcycle operator footrest relative to the footrest mounting axis of a motorcycle having an angled footrest pivot bracket.

DETAILED DESCRIPTION

Figure 5:
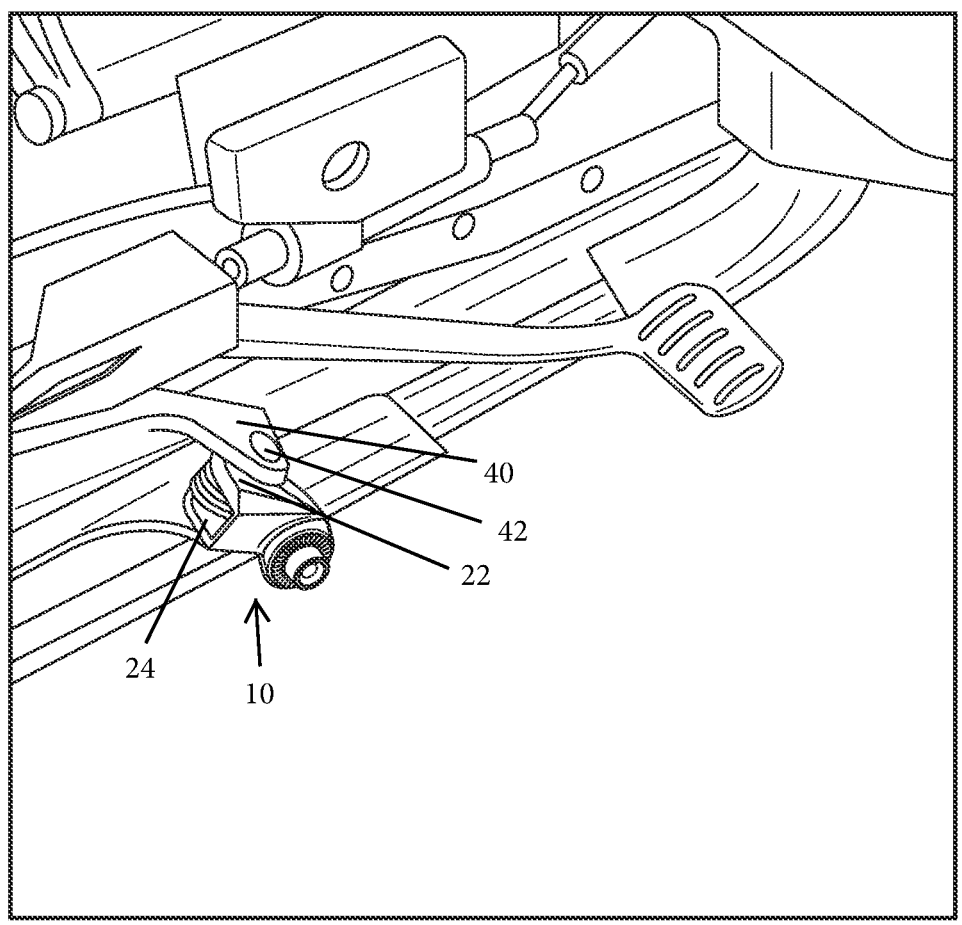
FIG. 5 is a top perspective diagrammatical view of the footrest mount adapter mounted to a pivot bracket of the motorcycle.

A footrest mount adapter 10 as shown in FIGS. 1-4 includes a generally planar footrest mounting body 12 having an upper portion 14 and a lower portion 16, a front surface 18 and a rear surface 20. By way of example, lower portion 16 has a body width of about 1.0 inch. In one embodiment, a pair of spaced and generally parallel mounting flanges 22 and 24 are integrally connected to and extend generally normal to the rear surface 20 of the upper portion 14 of body 12. Flanges 22 and 24 are configured to mate with a stock angled pivot bracket on a motorcycle, such as a Honda Goldwing motorcycle. Flanges 22 and 24 each include a radiused corner 26 adjacent to an opening 28 and a stop surface 30 below and extending rearward from the radiused corner 22. Openings 28 permit pivotal connection of the footrest mount adapter 10 to the stock pivot bracket 40 on the motorcycle, such as with a pin connector 42 (FIG. 5). In an alternative embodiment, flanges 22 and 24 can be integrally connected to form a single flange or mounting post.

Figure 3:
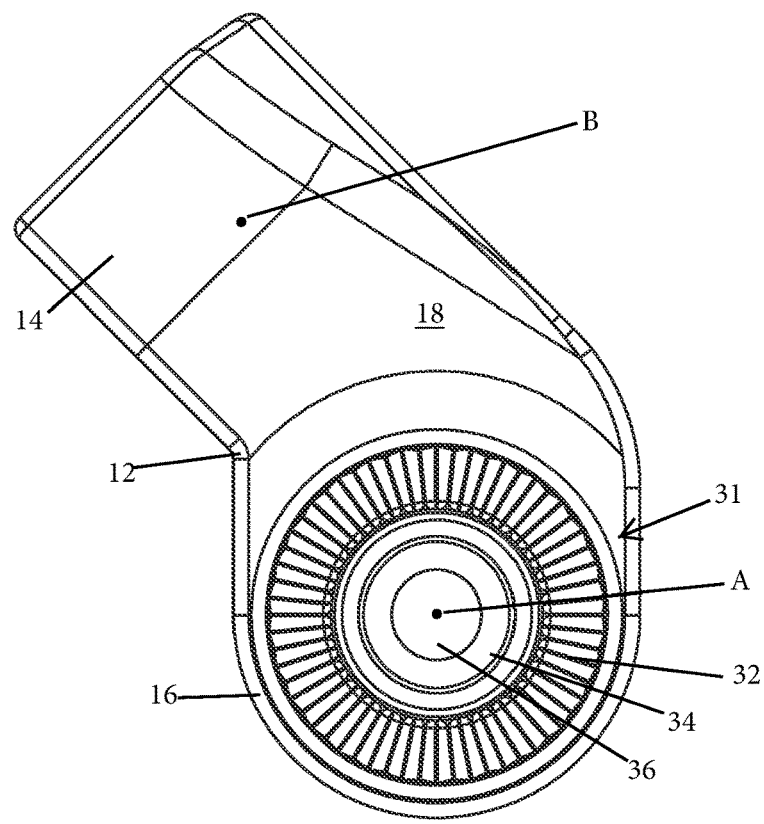
FIG. 3 is a front elevation view of the footrest mount adapter of FIG. 1.
Figure 4:
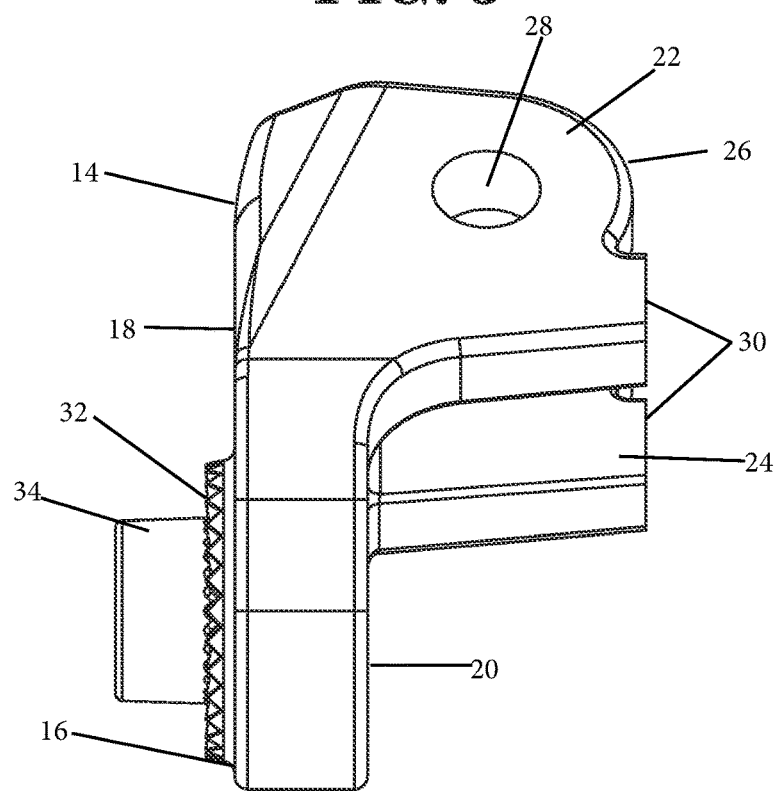
FIG. 4 is side elevation view of the footrest of FIG. 1

As shown in FIG. 3, the lower portion 16 of body 12 extends at an angle relative to upper portion 14. In one embodiment, the lower portion 16 of body 12 extends at an angle of about 45 degrees relative to the upper portion 14 of body 16. The outer surface 18 of lower portion 16 includes a footrest mount 31. In one embodiment, footrest mount 31 comprises a circular splined pattern 32 in outer surface 18 that surrounds a central cylindrical post or protrusion 34 that is coaxial with the circular splined pattern 32 and extends normal to outer surface 18. The protrusion 34 is configured with a coaxial internally threaded bore 36 that extends from front surface 18 to rear surface 20. Protrusion 34 is configured to mate with a cavity of a footrest that is surrounded by a splined surface (not shown), with internally threaded bore 36 permitting attachment of the footrest to the footrest mount adapter 10 with a threaded connector (not shown).

Figure 1:
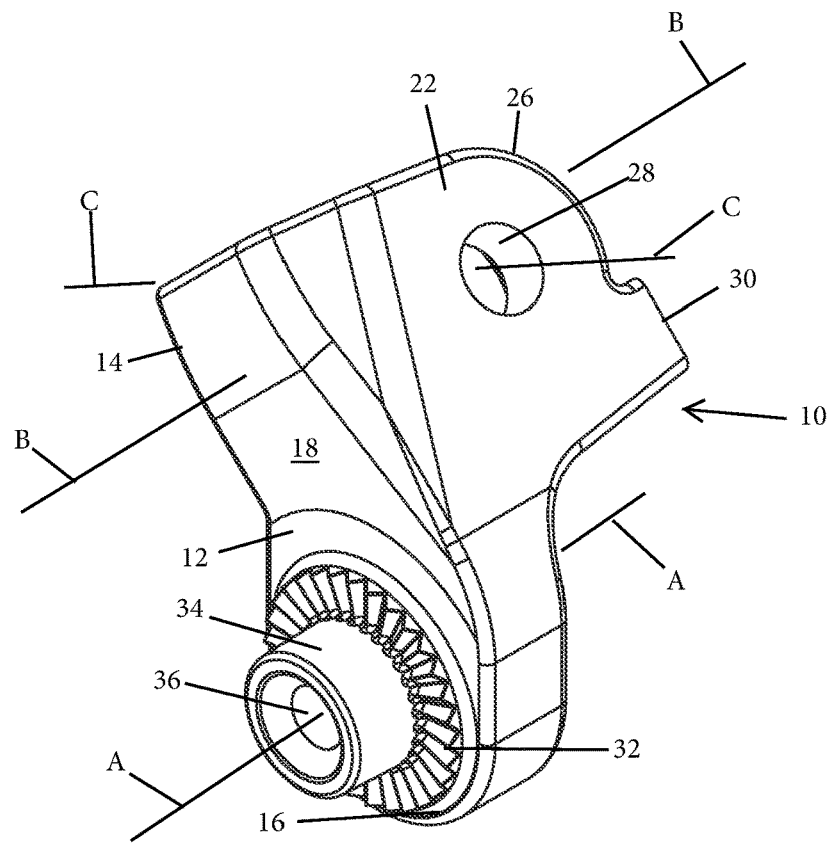
FIG. 1 is a front perspective view of a motorcycle footrest mount adapter.
Figure 2:
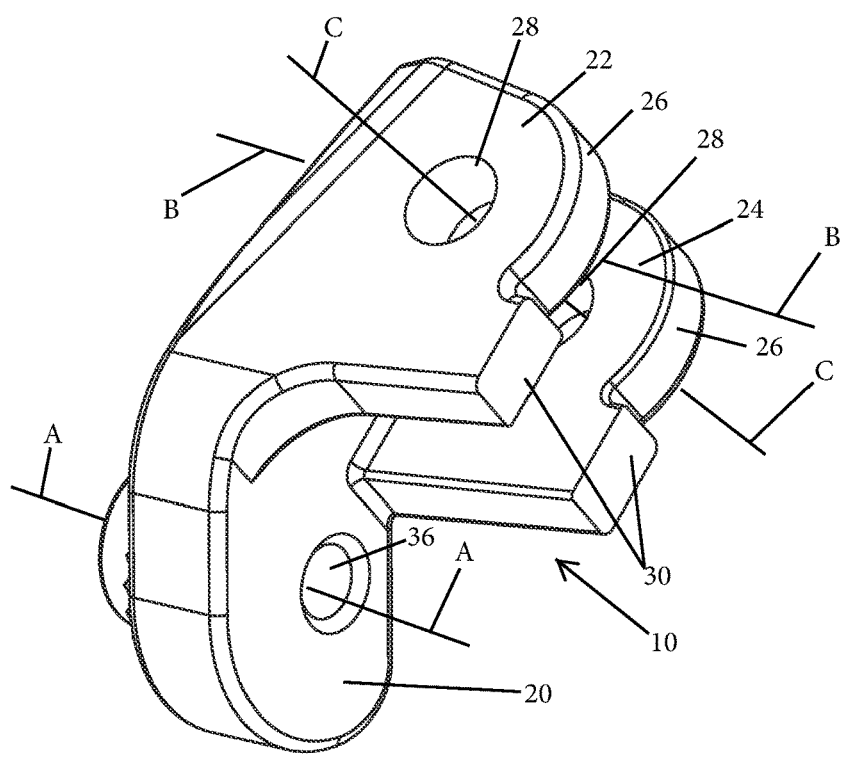
FIG. 2 is a rear perspective view of the footrest mount adapter of FIG. 1.

As shown in FIGS. 1-3, the axis A of bore 36 defines a footrest mounting axis. Axis A is lower than a parallel imaginary line B, which is generally normal to a midpoint of front surface 18 of upper portion 14 (i.e., a point generally midway between and end of upper portion 14 and the intersection of upper portion 14 and lower portion 16). Line B generally bisects the pivot axis C between the openings 28 of flanges 22 and 24. Line B corresponds to a general location of the stock footrest relative to the stock mounting flanges for certain Goldwing motorcycles (i.e., the stock footrest mounting axis). In one embodiment, axis A is located about 1.0 inches below line B. In one embodiment, body 12 has a wall thickness of about 0.4 inches and flanges 22 and 24 have a wall thickness of about 0.25 inches. In one embodiment, footrest mount adapter 10 is formed from investment cast stainless steel.

FIG. 5 is a top perspective diagrammatic representation of a portion of a motorcycle showing a pivot bracket 40 carried on the motorcycle below the operator seating area. As shown in FIG. 5, pivot bracket 40 includes mounting flanges that are oriented at a downward angle. By way of example, pivot bracket 40 is disposed at about a 45 degree downward angle relative to a horizontal midline of the motorcycle. Flanges 22 and 24 of the footrest mount adapter 10 permit connection of adapter 10 between the flanges of the pivot bracket 40 with a pin connector 42, which allows adapter 10 to pivot about a non-vertical pivot axis defined by pin connector 42 from a first position as shown in FIG. 5, to a second position toward the left or rear of the pivot bracket as shown in FIG. 5. The adapter 10 is biased towards the first position using a stock spring positioned between flanges 22 and 24, in the same manner as the stock footrest. In the lowered position, stop surfaces 30 of flanges 22 and 24 contact a base of the pivot bracket to aid in supporting a footrest in the first position. The adapter 10 is able to locate the footrest mount 31 below the pivot bracket 40, which allows a motorcycle operator desiring a lower foot position to mount a footrest of various types and sizes below the location of the stock footrest. The lowered footrest mount of adapter 10 relative to the pivot bracket 40 also allows attachment of footrests having larger dimensions, such as a floorboard, and permits such footrests to pivot to the second position.

The footrest mount adapter disclosed includes flanges that attach to the stock pivot bracket on the motorcycle used to mount a footrest, however the body of the adapter includes a lower portion that extends below the stock footrest mounting axis. The lower portion of the body includes a footrest mount, which in one embodiment is configured with a protrusion or post that includes an internally threaded bore for connecting a footrest to the footrest mount adapter. The splined outer surface of the lower body portion that surrounds the protrusion can mate with a corresponding splined surface on the footrest to adjust the footrest position to a desired position. The adapter provides a lowered mounting location (i.e., a lowered footrest mounting axis for a footrest relative to the stock footrest mounting axis, which allows larger footrests to be mounted and able to pivot away toward the motorcycle in the event the footrest contacts a stationary object, e.g., the ground. The adapter also positions the mounting location for a footrest forward of the pivot axis.

Although the footrest mount adapter has been described with reference to preferred embodiments, workers skilled in the art will recognize that changes can be made in form and detail without departing from the spirit and scope of the disclosed mounting arm. Applicant intends that the examples described above do not limit the scope of application's invention, which is defined by the claims below. Applicant's descriptions are not intended to redefine the terms set forth in the claims unless applicant has expressly stated that a term means something different than the plain import of the terms.

What is claimed is:

1. A footrest mount adapter for connection to a motorcycle having a footrest pivot bracket that defines a non-vertical footrest pivot axis, the footrest mount adapter comprising:
    a planar body having a first portion and a second portion in a common plane, the body further having a front surface and a rear surface, the first portion oriented at an angle relative to the second portion,
    a flange connected to and extending generally normal from the rear surface of the first portion of the body, the flange having an opening therethrough, the flange positionable in the footrest pivot bracket with the opening coaxially aligned with the pivot axis of the pivot bracket;
    wherein the second portion is configured to define a footrest mount spaced from the first body portion, the footrest mount capable of mounting a footrest to the adapter.

2. The footrest mount adapter of claim 1, wherein the flange comprises first and second spaced flange portions.

3. The footrest mount adapter of claim 1, wherein the first portion of the body is oriented at an angle of about 45 degrees relative to the second portion of the body.

4. The footrest mount adapter of claim 1, wherein the footrest mount comprises a cylindrical post extending normal to the front surface of the second portion of the body, an internally threaded bore coaxial with the cylindrical post that extends from the front surface to the inner rear surface of the body, and a splined surface pattern in the front surface surrounding the cylindrical post.

5. The footrest mount adapter of claim 1, wherein the footrest mount defines a footrest mounting axis that is generally normal to the front surface, the footrest mounting axis being spaced from and generally parallel to an imaginary line extending generally normal to the front surface of the first portion of the body at a midpoint of the first portion.

* * * * *